United States Patent
Seger et al.

(10) Patent No.: US 7,111,996 B2
(45) Date of Patent: Sep. 26, 2006

(54) STEREO CAMERA ARRANGEMENT IN A MOTOR VEHICLE

(75) Inventors: Ulrich Seger, Leonberg (DE); Uwe Apel, Neckartailfingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/468,491

(22) PCT Filed: Dec. 4, 2002

(86) PCT No.: PCT/DE02/04436

§ 371 (c)(1),
(2), (4) Date: May 18, 2004

(87) PCT Pub. No.: WO03/053743

PCT Pub. Date: Jul. 3, 2003

(65) Prior Publication Data

US 2004/0208497 A1  Oct. 21, 2004

(30) Foreign Application Priority Data

Dec. 20, 2001 (DE) ............................ 101 62 652

(51) Int. Cl.
*G03B 17/00* (2006.01)
(52) U.S. Cl. .................. 396/419; 396/427; 348/148
(58) Field of Classification Search ............. 396/419, 396/427, 428; 348/148
See application file for complete search history.

(56) References Cited

U.S. PATENT DOCUMENTS

| 5,096,287 | A |   | 3/1992 | Kakinami et al. |
| 5,530,420 | A | * | 6/1996 | Tsuchiya et al. ............ 340/435 |
| 6,170,955 | B1 | * | 1/2001 | Campbell et al. ........... 359/509 |
| 6,672,745 | B1 | * | 1/2004 | Bauer et al. ................. 362/545 |
| 6,811,330 | B1 | * | 11/2004 | Tozawa ....................... 396/428 |
| 2003/0059218 | A1 | * | 3/2003 | Sakata et al. ............... 396/429 |

FOREIGN PATENT DOCUMENTS

| DE | 196 47 200 | 1/1998 |
| DE | 100 10 434 | 9/2001 |
| EP | 1 087 257 | 3/2001 |
| JP | 04 194827 | 10/1992 |
| JP | 11 078737 | 6/1999 |
| JP | 2001 094842 | 8/2001 |

* cited by examiner

*Primary Examiner*—Christopher Mahoney
(74) *Attorney, Agent, or Firm*—Kenyon & Kenyon LLP

(57) ABSTRACT

A stereo camera system in a motor vehicle, in particular for classifying objects and determining distance. In order to ensure secure installation and precise positioning of the camera system, in particular fixing of its lateral position, the camera system is provided with at least two camera modules, and a mount, in which camera modules are installed at a specified lateral distance apart, the mount being cemented to the inside of the windshield.

18 Claims, 1 Drawing Sheet

STEREO CAMERA ARRANGEMENT IN A MOTOR VEHICLE

FIELD OF THE INVENTION

The present invention relates to a stereo camera system in a motor vehicle, in particular for classifying objects.

BACKGROUND INFORMATION

Stereo camera systems or stereo front-camera systems (SFK systems), in which two camera modules, generally parallel to one another, which detect the roadway area in front of the vehicle through the windshield, are mounted in the motor vehicle, are used for classifying objects on a roadway, for assigning attributes to objects, and for determining the distance of objects from a motor vehicle. For the required accuracy in determining the distance of contours in the stereo video image for distances greater than/equal to 40 m, the relative positions of the contours must be resolved into the micrometer range on the electronic imaging chips. To do this, the relative positioning of the two cameras to one another must be effected in a very precise and stable manner; in addition, the position of the camera system with respect to the vehicle must also be defined in a precise and stable manner at any given time.

For this purpose, a support, for example a diecasting of aluminum or magnesium, is mounted in the roof structure of the vehicle, which accommodates the camera modules in accommodating regions and the control and analyzing electronics in a central region. In addition, the support seals the optical path of the camera against soiling and scattered light and permits simpler installation of the camera system in the process of manufacture.

In such conventional stereo camera systems in a motor vehicle, however, changes in spacing of the camera modules with respect to one another and with respect to the motor vehicle are a problem. Changes in spacing that take place slowly, due for example to thermal expansion of the support, may be compensated for by readjustment of image correction data. For this purpose, the required parameters may be detected by a separate sensor system or may be determined directly from the image processing system.

On the other hand, brief changes in spacing, which may for example be injected into the support by vibrations, can generally not be corrected. The support system must therefore have a high degree of rigidity to all vibrations under the video frequency—generally 30 Hz–100 Hz, depending on the system. However, more rigid design of the support generally results in higher manufacturing costs and a higher total weight and yet fails to provide sufficient suppression of vibrations.

SUMMARY OF THE INVENTION

In contrast, the stereo camera system according to the present invention has the advantage in particular that reliable and precise setting of the position of the camera modules, in particular their relative position to one another, is possible with relatively little expenditure and advantageously low manufacturing costs, low mass and low space requirement.

The present invention is based on the idea of utilizing the high resistance to deformation or even freedom from deformation of the windshield for stable alignment of the camera modules of the stereo camera system. To this end, the camera modules are accommodated in a mount that is cemented directly to the inside of the windshield. Due to this fastening, injection of vibrations of the sheet metal parts of the body into the camera system is at least greatly suppressed in the camera system. At the same time, the mount advantageously is free from any mechanical connection to the roof of the vehicle. Here the sensor system may be covered or sealed off from the rest of the interior of the vehicle by for example an additional cover, installed between the windshield and the roof region, which is not in contact with the mount. Data lines and power supply lines are provided between the camera modules and a control means for control and optionally analysis. In this connection, the control means may be fastened in an independent housing in the vehicle roof, so that the total mass of the camera system cemented to the windshield is small. At the same time, injection of vibrations via the data lines and power supply lines is negligible and may be minimized by using flexible lines.

According to the present invention, a one-piece mount may be advantageously used, so that the relative distance of the two camera modules is specified and fixed by the rigid design of the mount. In this connection, the material of the mount advantageously has a coefficient of thermal expansion similar to that of the glass material of the windshield, so that the development of stresses and loosening of the cementing connection is prevented. This material may in particular be a synthetic material that advantageously has a low weight and thus does not substantially increase the total mass of the camera system cemented to the windshield.

Alternatively to the use of a one-piece mount, the use of a mount having two separate parts, each of which surrounds a camera module and is fastened to the windshield by cementing, is also possible. Here the mount parts seal off the space in front of the lens between the camera modules and may for example be cemented accurately to the windshield by an automated handling procedure.

In order to prevent the development of excessively high pressure differences between the space in front of the lens within the mount and the surrounding camera region of the cover, a pressure equalizing device may be provided in the mount in all embodiments. This may be done by for example an elastic, for example bellows-like, region, or advantageously by a gas-permeable and moisture- and dirt-impermeable region, for example a semi-permeable membrane of a suitable textile material, for example microfiber material.

According to the present invention, lifelong sealing of the space in front of the lens against dust and moisture and protection from scattered light may in particular be obtained.

The mechanical stress of the cementing surfaces between the mount and the windshield due to auto body deformations, which occur with the use of a rigid supporting system mounted in the roof region, are absent in the system according to the present invention.

In this connection, according to the present invention, rapid, simple and secure assembly is made possible in that the camera modules are first inserted into the mount. For this purpose a snap-in or snap-fit mechanism may for example be provided in the mount for accommodation of the camera modules, in for example their lens region, in order to ensure secure positioning and firm seating. The mount with the camera modules in place is then cemented to the inside of the windshield. These steps may be executed immediately after production of the windshield, for example in the windshield production shops, so that the windshield together with the camera system composed of camera modules and mount can be delivered as one structural unit. After insertion of the windshield into the body, electrical connection of the camera modules, in particular data connection with the control means via a flexible data line, and installation of the cover between windshield and roof region take place.

DETAILED DESCRIPTION

Figure 1:
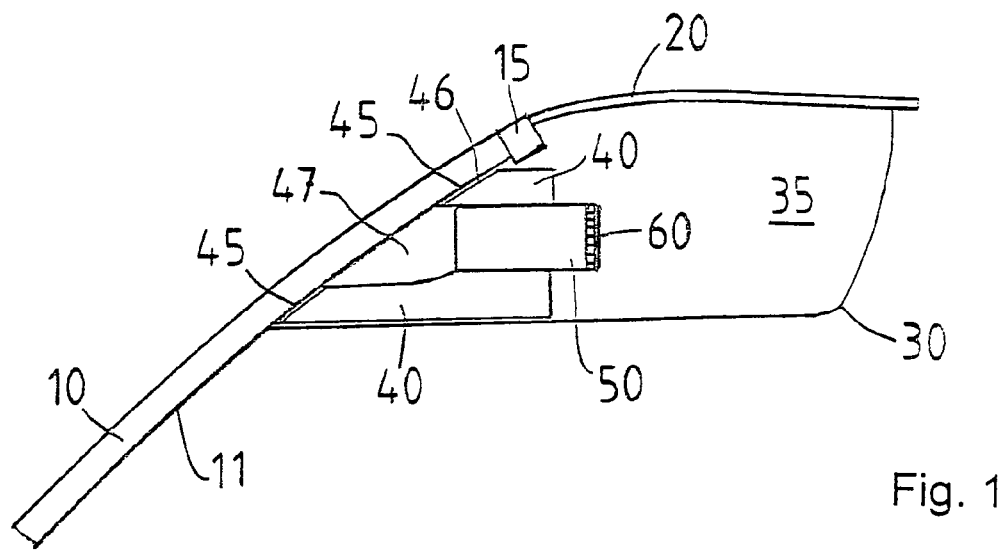
FIG. 1 shows a longitudinal section through a stereo camera system according to one embodiment of the invention.
Figure 2:
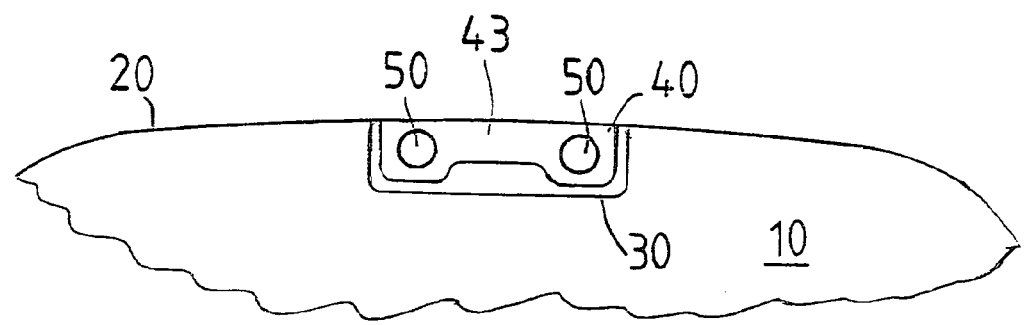
FIG. 2 shows a cross section through the system of FIG. 1.
Figure 3:
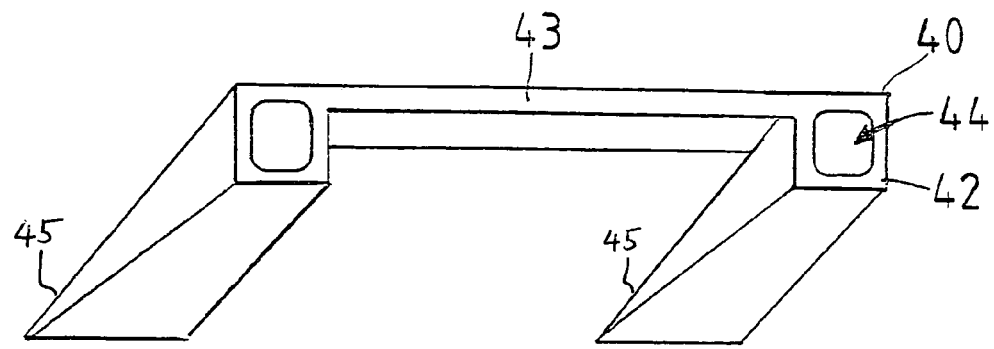
FIG. 3 shows a perspective view of a mount according to the present invention.

FIG. 1 shows, as a partial view of a motor vehicle, an upper region of windshield 10, which is connected by a seal 15 with a roof section 20 of the vehicle. A cover 30 is provided between the inside 11 of windshield 10 and roof section 20 and encloses a camera region 35. Provided in camera region 35 is a mount 40, which is fastened to the inside 11 of windshield 10 in cementing regions 45 by a cementing layer 46. According to FIGS. 1, 2, mount 40 does not rest against cover 30. Mount 40 holds two camera modules 50, essentially parallel to one another, at a specified distance apart, a space 47 in front of the lens being formed between each camera module 50 and windshield 10, in order not to influence the optical path in front of the camera modules. Cementing regions 45 advantageously extend annularly about spaces 47, in front of the lenses so that mount 40 covers the camera modules at the bottom and at the sides and thus keeps scattered light away from camera modules 50. According to FIGS. 2, 3, the mount may for this purpose have closed recesses 42, in which according to FIG. 2 a round recess or according to FIG. 3 a rectangular recess 44 is formed for secure installation of the camera modules. Lateral positioning of recesses 42 with respect to one another is ensured by crosspiece 43. The front of crosspiece 43 may alternatively also serve as cementing region for fastening to the inside 11 of windshield 10. The recesses in mount 40 may be designed, according to FIG. 1, with a uniform cross section in the longitudinal direction or, according to FIG. 3, with a tapering cross section for fixing camera modules 50 in the longitudinal direction.

The power supply of camera modules 50 and input of the data of camera modules 50 are provided by one or two printed circuit boards 60 on the back of camera modules 50, while flexible cables, not shown, for the power supply and the data line run from the printed circuit boards 60 to a control means outside cover 30.

What is claimed is:

1. A stereo camera system in a motor vehicle having a windshield, the stereo camera system comprising:
   at least two camera modules; and
   a mount in which the camera modules are situated at a preselected lateral distance apart, the mount being cemented to an inside of the windshield,
   wherein the mount is one piece and has two mounting regions, each of which holds one of the camera modules and is rigidly connected to the other by a crosspiece, and wherein the front of the crosspiece serves as a cementing region for fastening to the inside of the windshield, and wherein contact surfaces of the mount are sealed off on the inside of the windshield by a permanently elastic seal.

2. The stereo camera system according to claim 1, wherein the stereo camera system is for classifying objects.

3. The stereo camera system according to claim 1, wherein the the two mounting regions are cemented to the inside of the windshield at a preselected lateral distance from the other.

4. The stereo camera system according to claim 1, wherein spaces are formed in front of lenses between the camera modules and the windshield.

5. The stereo camera system according to claim 4, wherein the mount is cemented on the inside of the windshield in cementing regions around the spaces in front of a lens.

6. The stereo camera system according to claim 1, wherein the camera modules are connected together by an assembly support that is situated separate from the mount.

7. The stereo camera system according to claim 1, wherein a material of the mount has a coefficient of thermal expansion that substantially corresponds to a coefficient of thermal expansion of the windshield.

8. The stereo camera system according to claim 7, wherein the material is a synthetic material.

9. The stereo camera system according to claim 1, further comprising a cover affixed to the windshield and a roof section of the vehicle and surrounding a camera region in which the mount is provided including the camera modules.

10. The stereo camera system according to claim 1, further comprising a printed circuit board for data capture and power supply of the camera modules, situated on a back of the camera modules.

11. The stereo camera system according to claim 10, further comprising a data line provided from one of (a) the camera modules and (b) the printed circuit board, to a control device mounted separately from the mount.

12. The stereo camera system according to claim 1, further comprising a snap-in mechanism for a fixed-position installation of the camera modules, situated in the mount.

13. The stereo camera system according to claim 12, wherein the mechanism is for the fixed-position installation of a lens region of the camera modules.

14. A stereo camera system in a motor vehicle having a windshield, the stereo camera system comprising:
   at least two camera modules;
   a mount in which the camera modules are situated at a preselected lateral distance apart, the mount being cemented to an inside of the windshield, wherein the mount is one piece and has two mounting regions, each of which holds one of the camera modules and is rigidly connected to the other by a crosspiece and wherein the front of the crosspiece serves as a cementing region for fastening to the inside of the windshield; and
   means, provided in the mount, for equalizing pressure of free spaces with respect to a surrounded space.

15. The stereo camera system according to claim 14, wherein the surrounded space is a camera region.

16. The stereo camera system according to claim 14, wherein the means for equalizing pressure contains semi-permeable regions.

17. The stereo camera system according to claim 16, wherein the semi-permeable regions include an air-permeable and moisture-impermeable material.

18. The stereo camera system according to claim 17, wherein the material is a microfiber textile material.

* * * * *